United States Patent
Leuthner et al.

(10) Patent No.: US 12,411,052 B2
(45) Date of Patent: Sep. 9, 2025

(54) PISTON DIAPHRAGM SEAL AND SYSTEM COMPRISING A PRESSURE TRANSDUCER AND A PISTON DIAPHRAGM SEAL

(71) Applicant: Endress+Hauser SE+Co. KG, Maulburg (DE)

(72) Inventors: Dietmar Leuthner, Weil am Rhein (DE); Klaus Behrendt, Lörrach (DE); Jacobo Carrasco Heres, Freiburg (DE); Peter Probst, Weil am Rhein (DE); Alfred Schmelzle, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 211 days.

(21) Appl. No.: 18/164,764

(22) Filed: Feb. 6, 2023

(65) Prior Publication Data

US 2023/0251156 A1      Aug. 10, 2023

(30) Foreign Application Priority Data

Feb. 4, 2022   (DE) ...................... 10 2022 102 680.9

(51) Int. Cl.
 *G01L 19/06* (2006.01)
 *G01L 19/00* (2006.01)
(52) U.S. Cl.
 CPC ...... *G01L 19/0627* (2013.01); *G01L 19/0046* (2013.01)
(58) Field of Classification Search
 None
 See application file for complete search history.

(56) References Cited

U.S. PATENT DOCUMENTS

| | | | |
|---|---|---|---|
| 9,766,145 B2 * | 9/2017 | Deane | G01L 19/0046 |
| 2011/0146370 A1 * | 6/2011 | Glaser | G01L 25/00 73/1.57 |
| 2013/0014588 A1 | 1/2013 | Feldmeier | |

FOREIGN PATENT DOCUMENTS

| | | | | |
|---|---|---|---|---|
| CN | 110017939 A | * | 7/2019 | ........... G01L 19/003 |
| DE | 10144230 A1 | | 3/2003 | |
| DE | 10200779 A1 | | 7/2003 | |
| DE | 102013021025 A1 | | 6/2015 | |

* cited by examiner

*Primary Examiner* — Peter J Macchiarolo
*Assistant Examiner* — Jermaine L Jenkins
(74) *Attorney, Agent, or Firm* — Kelly J. Smith; Endress+Hauser (USA) Holding, Inc.

(57) ABSTRACT

The present disclosure relates to a piston diaphragm seal for transmitting a pressure of a medium to a pressure-measuring sensor a base body having a recess and a bore which is connected to the recess. The recess and the bore can be filled with a pressure transfer medium. A piston is arranged in the recess and can be moved within a predetermined region in the recess. A surface of the piston facing the medium can be loaded with the pressure of the medium, wherein the piston is separated by at least two sealing elements from the medium and the pressure transfer medium. A cavity is arranged in the piston between the at least two sealing elements. An attachment region is provided for connecting the piston diaphragm seal to the pressure-measuring sensor. A monitoring unit is designed to determine and/or monitor entry of medium and/or pressure transfer medium into the cavity.

7 Claims, 2 Drawing Sheets

PISTON DIAPHRAGM SEAL AND SYSTEM COMPRISING A PRESSURE TRANSDUCER AND A PISTON DIAPHRAGM SEAL

CROSS-REFERENCE TO RELATED APPLICATION

The present application is related to and claims the priority benefit of DPMA Patent Application No. 10 2022 102 680.9, filed on Feb. 4, 2022, the entire contents of which are incorporated herein by reference.

TECHNICAL FIELD

The invention relates to a piston diaphragm seal for transmitting a pressure of a medium to a pressure-measuring sensor and also relates to a system comprising a pressure-measuring sensor and a piston diaphragm seal.

BACKGROUND

In pressure measurement technology, absolute, differential and relative pressure-measuring sensors are known. Absolute pressure-measuring sensors determine the prevailing pressure of a medium absolutely, i.e., in relation to vacuum, while differential-measuring sensors determine the difference between two different pressures of the medium or media. In the case of relative pressure-measuring sensors, the pressure of the medium to be measured is determined relative to a reference pressure, wherein the atmospheric pressure prevailing in the environment of the relative pressure-measuring sensor serves as reference pressure.

Pressure-measuring sensors have a pressure-sensitive measuring element, the so-called pressure sensor, to the first and second surfaces of which a pressure is respectively applied. In the case of absolute or relative pressure-measuring sensors, the pressure of the medium to be determined acts on the first surface of the pressure sensor, while an absolute or reference pressure acts on the second surface. In the case of differential pressure-measuring sensors, a first pressure and a second pressure of a medium are respectively applied to the two surfaces. The measuring element bends as a function of the relative pressure present, which is formed from the difference between the pressures applied to the two surfaces. This bending is converted by means of an electronic unit into an electrical signal, which depends on the relative pressure and is then available for further processing or evaluation. In this case, a distinction is made, inter alia, between capacitive and piezo-resistive pressure sensors. The companies of the Endress+Hauser Group manufacture and market a variety of such relative pressure-measuring sensors.

The pressure-measuring sensor is separated from the medium by means of a separating diaphragm, which is designed to transmit to the pressure sensor a pressure of the medium applied to the separating diaphragm. For this purpose, the, generally disk-shaped, separating diaphragm has only a small thickness. Such separating diaphragms are less suitable for abrasive media since impacts from foreign bodies, particles and the like can deform or damage the separating diaphragm.

For abrasive media, a piston diaphragm seal is preferably connected upstream of the pressure-measuring sensor, which has a movably mounted, robust piston, which is separated from the medium by means of at least one sealing element and which is designed to transmit a pressure of the medium to the separating diaphragm of the pressure-measuring sensor. In the event of a failure or a leak of the at least one sealing element, however, the pressure of the medium applied to the piston is no longer reliably transmitted to the separating diaphragm of the pressure-measuring sensor.

SUMMARY

The object of the present invention is therefore to provide a piston diaphragm seal with which a failure of the piston diaphragm seal is monitored.

The object of the present disclosure is achieved by a piston diaphragm seal and a system according to the present disclosure.

With regard to the piston diaphragm seal, the object is achieved according to the invention by a piston diaphragm seal for transmitting a pressure of a medium to a pressure-measuring sensor, with
 a base body having a recess and a bore which is connected to the recess, wherein the recess and the bore can be filled with a pressure transfer medium,
 a piston which is arranged in the recess and can be moved within a predetermined region in the recess, wherein a surface of the piston facing the medium can be loaded with the pressure of the medium, wherein the piston is separated by at least two sealing elements from the medium and the pressure transfer medium, wherein a cavity is arranged in the piston between the at least two sealing elements,
 an attachment region for connecting the piston diaphragm seal to the pressure-measuring sensor, and with
 a monitoring unit which is designed to determine and/or monitor entry of medium and/or pressure transfer medium into the cavity.

In the event of a leak of at least one of the at least two sealing elements, medium and/or pressure transfer medium enters the cavity, which is detected by the monitoring unit. Subsequently, information about the leak of the piston diaphragm seal can be output, for example to a user interface. At least one of the at least two sealing elements serves to seal the cavity off from the medium, and at least one other of the at least two sealing elements serves to seal the cavity off from the pressure transfer medium. The cavity itself is, for example, filled with air or gas or has a vacuum.

The surface of the piston facing the medium is loaded with the pressure of the medium so that, in the case of a relative increase in the pressure of the medium, the piston is moved into the recess, and in the case of a relative decrease in the pressure of the medium, the piston is moved in the direction of the medium within the predetermined region. The movement or deflection of the piston within the predetermined region corresponds to a defined pressure range which is to be determined and/or monitored by the pressure-measuring sensor. A movement of the piston beyond the predetermined region is an indication of a fault in the piston diaphragm seal since, for example, at least one of the at least two sealing elements is leaky.

In one embodiment, the monitoring unit has a sensor and/or an electrical switch.

In particular, the sensor is a conductance, moisture or limit level sensor.

The electrical switch is in particular designed as a conductor through which current flows and which is coated with a coating which is soluble in the medium and/or in the pressure transfer medium. A defined current flows through the conductor in the functional piston diaphragm seal. As soon as the medium and/or pressure transfer medium enters the cavity, the coating of the conductor will dissolve, as a result of which the current flowing through the conductor is reduced since some of the current flows away through the medium and/or the pressure transfer medium via the base body of the piston diaphragm seal. A deviation of the measured current from the defined current thus indicates a leak of the piston diaphragm seal.

Preferably, a closable filling bore for filling the piston diaphragm seal with pressure transfer medium is arranged in the base body.

Advantageously, the cavity is arranged parallel to the at least two sealing elements and/or is annular. The cavity is, for example, an annular cavity, in particular encircling the piston.

With regard to the system, the object is achieved according to the invention by a system comprising a pressure-measuring sensor and a piston diaphragm seal, wherein the pressure-measuring sensor has a separating diaphragm, a pressure sensor and a connection region, wherein the piston diaphragm seal is designed with a base body having a recess and a bore which is connected to the recess, wherein the recess and the bore are filled with a pressure transfer medium, a piston which is arranged in the recess and can be moved within a predetermined region in the recess, wherein a surface of the piston facing the medium can be loaded with the pressure of the medium, wherein the piston is separated by at least two sealing elements from the medium and the pressure transfer medium, wherein a cavity is arranged in the piston between the at least two sealing elements, an attachment region for connecting the piston diaphragm seal to the pressure-measuring sensor, and with a monitoring unit which is designed to determine and/or monitor entry of medium and/or pressure transfer medium into the cavity, wherein the piston diaphragm seal and the pressure-measuring sensor are connected to one another in the attachment region and in the connection region in such a way that the bore opens in the region of the separating diaphragm, wherein the pressure transfer medium is designed to transmit the pressure of the medium from the piston to the separating diaphragm, wherein the pressure sensor can be loaded with the pressure of the medium at least by means of the separating diaphragm.

In the system according to the invention, it is detected by means of the monitoring unit whether there is a leak of at least one of the at least two sealing elements. If such a leak occurs, a reliable transmission of the pressure of the medium via the piston diaphragm seal to the pressure-measuring sensor is no longer ensured, and information about the leak or a warning can be output.

The above-mentioned embodiments for the piston diaphragm seal according to the invention also apply, mutatis mutandis, to the system according to the invention.

BRIEF DESCRIPTION OF THE DRAWINGS

The present invention is explained in more detail below with reference to the following FIGS. 1-2. In the figures.

DETAILED DESCRIPTION

Figure 1:
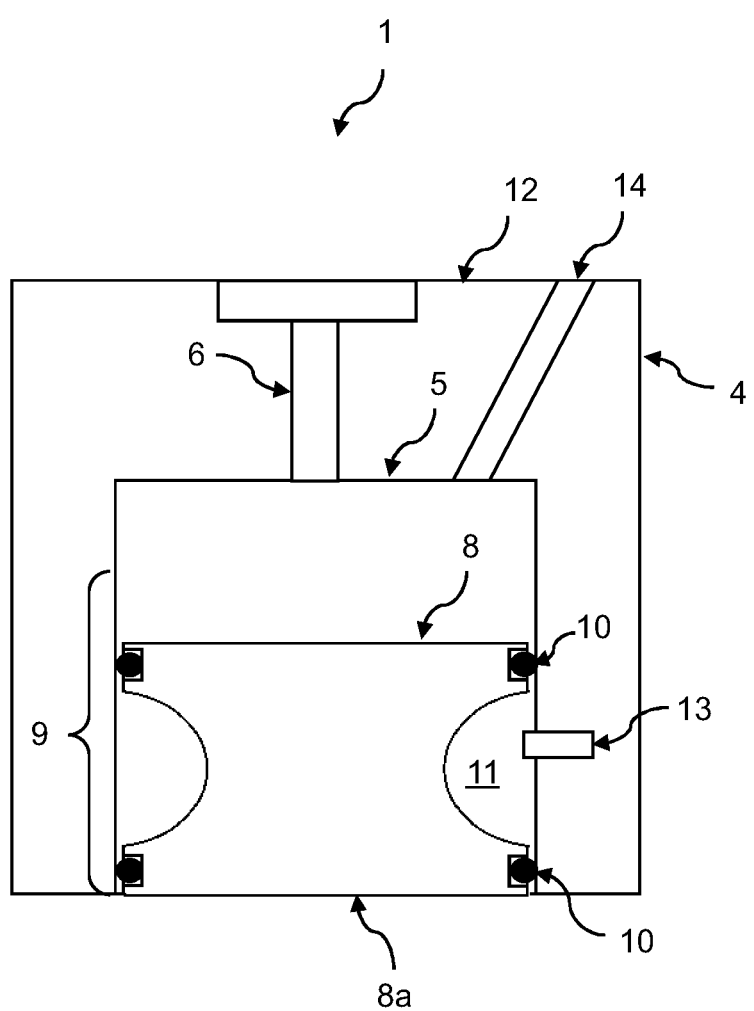
FIG. 1 shows a schematic diagram of the piston diaphragm seal according to the present disclosure.

FIG. 1 shows a piston diaphragm seal 1 according to the invention for transmitting a pressure of a medium 2 to a pressure-measuring sensor 3. A recess 5, a bore 6 and an optional filling bore 14 are arranged in a base body 4 of the piston diaphragm seal 1. The optional filling bore 14 is used to fill the piston diaphragm seal 1, in particular the recess 5 and the bore 6, with a pressure transfer medium 7. Since the bore 6 in the system 15 according to the invention is only closed by the connection to the pressure-measuring sensor 3, the piston diaphragm seal 1 is only filled after the connection to the pressure-measuring sensor 3. The bore 6 can take different shapes: in FIG. 1, the bore is designed as a straight, narrow bore, which widens in the direction of the pressure-measuring sensor 3. Any further embodiments of the bore 6, not shown here, are also conceivable. The bore 6 is always connected to the recess 5.

A piston 8 is arranged in the recess 5 and is movable within a predetermined region 9 in the recess 5. A surface 8a of the piston 8 facing the medium 2 can be loaded with the pressure of the medium 2. Depending on the pressure of the medium 2, the piston 8 will move within the predetermined region 9 and transmit the pressure of the medium to the pressure-measuring sensor 3 by means of the pressure transfer medium 7. The piston 8 furthermore has a cavity 11, which is arranged between at least two sealing elements 10. The at least two sealing elements 10 seal the piston 8 off from the medium 2 and/or the pressure transfer medium 7 so that the cavity 11 is free of medium 2 and pressure transfer medium 7. The cavity 11 is in particular arranged parallel to the at least two sealing elements 10 and/or is annular.

A leak of at least one of the at least two sealing elements 10 leads to ingress of medium 2 and/or pressure transfer medium 7 into the cavity 11, which is determined and/or monitored by a correspondingly designed monitoring unit 13. For example, the monitoring unit 13 has a sensor, in particular a conductance, moisture or limit level sensor, and/or an electrical switch. The electrical switch can be designed as a conductor through which current flows and which is coated with a coating which is soluble in the medium 2 and/or in the pressure transfer medium 7. The monitoring unit 13 is in particular arranged at least partially in the region of the cavity 11. If medium 2 and/or pressure transfer medium 7 enters the cavity 11, the monitoring unit can be designed to transmit information about the ingress of the medium 2 and/or the pressure transfer medium 7 to a higher-level unit, a display unit, in particular of the pressure-measuring sensor, and/or a user interface.

Figure 2:
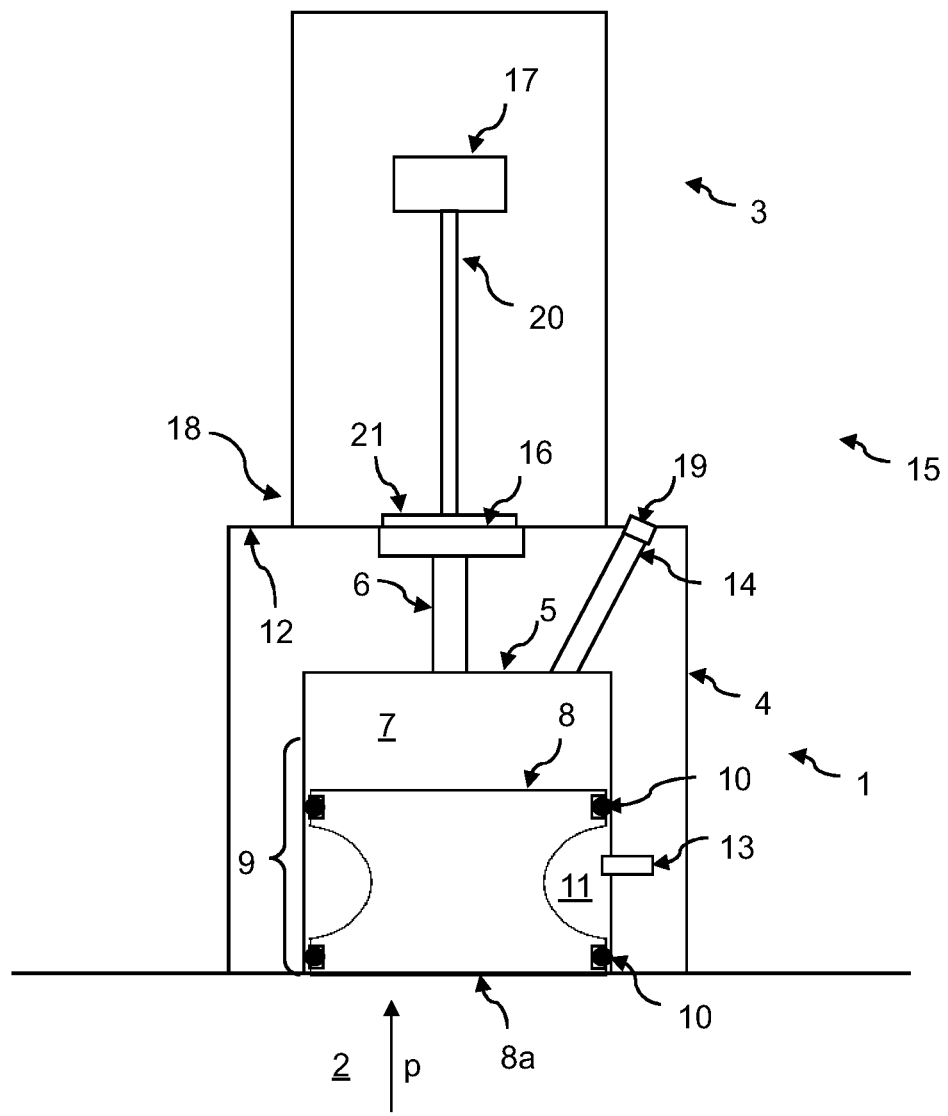
FIG. 2 shows a schematic diagram of the system according to the present disclosure.

The system 15 according to the invention, comprising a pressure-measuring sensor 3 and a piston diaphragm seal 1, is shown schematically in FIG. 2. The pressure-measuring sensor 3 has a separating diaphragm 16, a pressure sensor 17 and a connection region 18. The piston diaphragm seal 1 and the pressure-measuring sensor 3 are connected to one another, for example by means of a weld or flange, in the attachment region 12 and the connection region 18. The piston diaphragm seal 1 and the pressure-measuring sensor are connected in such a way that the bore 6 of the piston diaphragm seal 1 opens in the region of the separating diaphragm 16 in order to be able to transmit the pressure of the medium 2 via the piston diaphragm seal 1 to the separating diaphragm 16. The pressure-sensitive separating diaphragm 16 thus separates the pressure transfer medium 7 of the piston diaphragm seal 1 from an interior of the pressure-measuring sensor.

The pressure transfer medium 7 is designed to transmit the pressure of the medium 2 from the piston 8 to the separating diaphragm 16, wherein the pressure sensor 17 can be loaded with the pressure of the medium 2 at least by means of the separating diaphragm 16. The pressure sensor 17 can be arranged at or on the separating diaphragm 16 or at a distance therefrom. In the latter case, a pressure transfer medium is also necessary within the pressure-measuring sensor 3 and transmits the pressure of the medium 2 from the separating diaphragm 16 to the pressure sensor 17 and loads the latter with the pressure of the medium 2, wherein a capillary tube 20 can be used. The separating diaphragm 16 generally has a diaphragm bed 21 associated therewith. The bore 6 is designed, for example, in an end region facing the separating diaphragm 16 such that the pressure transfer medium 7 impinges areally on the separating diaphragm 16, in particular such that the pressure transfer medium 7 completely covers the separating diaphragm 16. The pressure of the medium 2 is transmitted via the surface of the piston 8 facing the medium 2, the piston 8 and the pressure transfer medium 7 to the separating diaphragm 16 so that the separating diaphragm 16 is loaded with the pressure of the medium 2.

In the example shown in FIG. 2, the pressure-measuring sensor 3 is designed as an absolute pressure-measuring sensor, which determines the pressure of the medium 2 relative to an absolute pressure, for example a vacuum. Alternatively, the pressure-measuring sensor can be designed as a relative or differential pressure-measuring sensor, wherein in the case of the differential pressure-measuring sensor, two piston diaphragm seals can optionally be used.

The embodiments of the piston diaphragm seal 1 with the recess 5, the bore 6, the optional filling bore 14, the piston 8 and the cavity 11 are analogous to that of the piston diaphragm seal 1 shown in FIG. 1, with the difference that the piston diaphragm seal 1 in the system 15 is filled with the pressure transfer medium 7. After filling, the optional filling bore 14 must be closed, for example with the aid of a plug 19.

In the example of FIG. 2, the piston 8 is arranged at a lower end region of the predetermined region 9, which corresponds, for example, to a lower end of a defined pressure range to be monitored by the pressure-measuring sensor. The piston diaphragm seal 1 is designed in such a way that the piston 8 moves only within the predetermined region 9 in the functional piston diaphragm seal 1. Only in the case of a leak or other damage to the piston diaphragm seal 1 will the piston 8 move out of the predetermined region 9.

The invention claimed is:

1. A piston diaphragm seal for transmitting a pressure of a medium to a pressure-measuring sensor, including:
   a base body having a recess and a bore which is connected to the recess, wherein the recess and the bore are filled with a pressure transfer medium;
   a piston which is arranged in the recess and moved within a predetermined region in the recess, wherein a surface of the piston facing the medium is loadable with the pressure of the medium, wherein the piston is separated by at least two sealing elements from the medium and the pressure transfer medium, wherein a cavity is arranged in the piston between the at least two sealing elements;
   an attachment region for connecting the piston diaphragm seal to the pressure-measuring sensor; and
   a monitoring unit which is designed to determine and/or monitor entry of the medium and/or pressure transfer medium into the cavity.

2. The piston diaphragm seal according to claim 1, wherein the monitoring unit has a sensor and/or an electrical switch.

3. The piston diaphragm seal according to claim 2, wherein the sensor is a conductance, moisture or limit level sensor.

4. The piston diaphragm seal according to claim 2, wherein the electrical switch is designed as a conductor through which current flows and which is coated with a coating which is soluble in the medium and/or in the pressure transfer medium.

5. The piston diaphragm seal according to at least one of claim 1, wherein a closable filling bore for filling the piston diaphragm seal with the pressure transfer medium is arranged in the base body.

6. The piston diaphragm seal according to at least one of claim 1, wherein the cavity is arranged parallel to the at least two sealing elements and/or is annular.

7. A system comprising a pressure-measuring sensor and a piston diaphragm seal, wherein the pressure-measuring sensor has a separating diaphragm, a pressure sensor and a connection region, wherein the piston diaphragm seal is designed, including:
   a base body having a recess and a bore which is connected to the recess, wherein the recess and the bore are filled with a pressure transfer medium;
   a piston which is arranged in the recess and is movable within a predetermined region in the recess, wherein a surface of the piston facing the medium is loadable with the pressure of the medium, wherein the piston is separated by at least two sealing elements from the medium and the pressure transfer medium, wherein a cavity is arranged in the piston between the at least two sealing elements;
   an attachment region for connecting the piston diaphragm seal to the pressure-measuring sensor; and
   a monitoring unit which is designed to determine and/or monitor entry of the medium and/or pressure transfer medium into the cavity;
   wherein the piston diaphragm seal and the pressure-measuring sensor are connected to one another in the attachment region and in the connection region in such a way that the bore opens in the region of the separating diaphragm, wherein the pressure transfer medium is designed to transmit the pressure of the medium from the piston to the separating diaphragm, wherein the pressure sensor is loadable with the pressure of the medium at least by means of the separating diaphragm.

* * * * *